(12) United States Patent
Valentine et al.

(10) Patent No.: US 8,752,538 B2
(45) Date of Patent: Jun. 17, 2014

(54) ROTISSERIE OVEN WITH LIFTING WASH ARM

(75) Inventors: Richard D. Valentine, Hillsboro, OH (US); Matthew A. Weber, Springboro, OH (US); James M. Heiser, Hillsboro, OH (US)

(73) Assignee: Premark FEG L.L.C., Glenview, IL (US)

( * ) Notice: Subject to any disclaimer, the term of this patent is extended or adjusted under 35 U.S.C. 154(b) by 665 days.

(21) Appl. No.: 12/323,673

(22) Filed: Nov. 26, 2008

(65) Prior Publication Data

US 2009/0178664 A1    Jul. 16, 2009

Related U.S. Application Data

(60) Provisional application No. 61/021,102, filed on Jan. 15, 2008.

(51) Int. Cl.
*A47J 37/04* (2006.01)

(52) U.S. Cl.
USPC ...... 126/21 A; 126/19 R; 126/1 R; 99/421 H; 219/400

(58) Field of Classification Search
USPC ..... 126/21 A, 19 R, 1 R; 99/421 H; 219/400; 134/24, 172
See application file for complete search history.

(56) References Cited

U.S. PATENT DOCUMENTS

| 2,017,663 | A |   | 10/1935 | Lahn |   |
| 2,029,268 | A | * | 1/1936 | Lund | 239/254 |
| 2,519,756 | A |   | 8/1950 | Hadley et al. |   |
| 2,558,589 | A |   | 6/1951 | Skolfield |   |
| 2,599,110 | A | * | 6/1952 | Royeroft | 134/56 D |
| 3,064,665 | A |   | 11/1962 | Martiniak |   |
| 3,077,200 | A | * | 2/1963 | Guth | 134/176 |
| 3,261,554 | A |   | 7/1966 | Perl |   |
| 3,333,531 | A |   | 8/1967 | Reuther |   |
| 3,373,754 | A |   | 3/1968 | Squire |   |
| 3,550,576 | A |   | 12/1970 | Saver |   |
| 3,698,377 | A |   | 10/1972 | Smith |   |
| 3,854,762 | A | * | 12/1974 | Spiegel et al. | 292/197 |
| 3,951,683 | A | * | 4/1976 | Jarvis et al. | 134/144 |
| 3,951,684 | A | * | 4/1976 | LaPrad et al. | 134/144 |
| 3,986,891 | A |   | 10/1976 | Rumbaugh |   |

(Continued)

FOREIGN PATENT DOCUMENTS

| DE | 2006622 | 8/1971 |
| DE | 2842771 | 4/1980 |

(Continued)

OTHER PUBLICATIONS

PCT, International Search Report and Written Opinion, International Application No. PCT/US2009/030236, 13 pages (Mar. 9, 2010).

(Continued)

*Primary Examiner* — Avinash Savani
(74) *Attorney, Agent, or Firm* — Thompson Hine LLP

(57) ABSTRACT

A rotisserie oven with a self-cleaning mechanism in the form of a lifting wash arm. The wash arm is driven to lift and rotate when washing the oven by the action of the pressure from the wash water used therein. By lifting, the wash arm negates the sealing action of fatty build-up around its base which would otherwise impede its rotation.

16 Claims, 6 Drawing Sheets

(56) References Cited

U.S. PATENT DOCUMENTS

| | | | |
|---|---|---|---|
| 4,353,559 A | 10/1982 | Budzich et al. | |
| 4,380,248 A | 4/1983 | Ambrus et al. | |
| 4,438,685 A | 3/1984 | Haas, Sr. et al. | |
| 4,442,143 A | 4/1984 | Reed | |
| 4,620,490 A | 11/1986 | Brady et al. | |
| 4,646,713 A | 3/1987 | Honigsbaum | |
| 4,741,809 A | 5/1988 | Becker et al. | |
| 4,800,824 A | 1/1989 | DiFonzo | |
| 4,998,550 A | 3/1991 | Archambault | |
| 5,058,806 A * | 10/1991 | Rupar | 239/205 |
| 5,085,443 A | 2/1992 | Richards | |
| 5,137,041 A | 8/1992 | Hall | |
| 5,191,831 A | 3/1993 | Walden | |
| 5,201,682 A | 4/1993 | Nakagawa et al. | |
| 5,241,975 A * | 9/1993 | Yanagihara | 134/56 D |
| 5,377,784 A | 1/1995 | Walkowiak et al. | |
| 5,427,129 A | 6/1995 | Young, Jr. et al. | |
| 5,451,744 A * | 9/1995 | Koopman et al. | 219/400 |
| 5,485,780 A | 1/1996 | Koether et al. | |
| 5,499,577 A | 3/1996 | Tommasini | |
| 5,560,694 A | 10/1996 | Banicevic et al. | |
| 5,678,430 A | 10/1997 | Merlin et al. | |
| 5,704,278 A | 1/1998 | Cross | |
| 5,765,838 A | 6/1998 | Ueda et al. | |
| 6,131,559 A | 10/2000 | Norris et al. | |
| 6,182,561 B1 | 2/2001 | Garner et al. | |
| 6,205,913 B1 | 3/2001 | Zittel et al. | |
| 6,318,245 B1 | 11/2001 | Durth et al. | |
| 6,330,855 B2 | 12/2001 | Backus et al. | |
| 6,405,738 B1 | 6/2002 | Clark et al. | |
| 6,410,890 B1 | 6/2002 | Kohlstrung | |
| 6,478,034 B1 | 11/2002 | Durth et al. | |
| 6,595,112 B2 | 7/2003 | Durth | |
| 6,622,754 B1 | 9/2003 | Roth et al. | |
| 6,626,190 B2 | 9/2003 | Durth et al. | |
| 6,772,751 B2 | 8/2004 | Deuringer et al. | |
| 6,904,904 B2 | 6/2005 | Walther et al. | |
| 6,918,398 B2 | 7/2005 | Edelmann et al. | |
| 7,060,942 B2 | 6/2006 | Friedl et al. | |
| 7,157,668 B2 | 1/2007 | Bartelick | |
| 2003/0000515 A1 | 1/2003 | Cole et al. | |
| 2003/0070799 A1 | 4/2003 | Mueller et al. | |
| 2004/0055477 A1 | 3/2004 | Swank et al. | |
| 2004/0098292 A1 | 5/2004 | Miller et al. | |
| 2004/0142082 A1 | 7/2004 | Friedl et al. | |
| 2004/0163635 A1 | 8/2004 | Thorneywork | |
| 2005/0006436 A1 | 1/2005 | Jordens et al. | |
| 2005/0022314 A1 | 2/2005 | Ambuter et al. | |
| 2005/0022676 A1 | 2/2005 | Swank et al. | |
| 2005/0076900 A1 | 4/2005 | Walther et al. | |
| 2005/0155498 A1 | 7/2005 | Killion | |
| 2005/0199616 A1 | 9/2005 | Stahli | |
| 2006/0054155 A1 | 3/2006 | Bujeau et al. | |
| 2006/0081593 A1 | 4/2006 | Benoit et al. | |
| 2006/0124627 A1 | 6/2006 | Friedl et al. | |
| 2006/0179583 A1 | 8/2006 | Ambuter et al. | |
| 2006/0196495 A1 | 9/2006 | Kim et al. | |
| 2006/0237425 A1 | 10/2006 | Kim et al. | |
| 2006/0284064 A1 | 12/2006 | Liu et al. | |
| 2007/0272682 A1 | 11/2007 | Chin | |
| 2008/0210277 A1 | 9/2008 | Kramer | |
| 2008/0223357 A1 | 9/2008 | Bartelick et al. | |
| 2008/0280040 A1 | 11/2008 | Barrall et al. | |

FOREIGN PATENT DOCUMENTS

| | | |
|---|---|---|
| DE | 3114951 | 11/1982 |
| DE | 3820572 | 12/1989 |
| DE | 4007198 | 10/1991 |
| DE | 19950920 | 5/2001 |
| DE | 10156419 | 6/2003 |
| DE | 102004006973 | 10/2004 |
| DE | 102006010460 | 9/2007 |
| EP | 0310741 | 4/1989 |
| EP | 0401173 | 12/1990 |
| EP | 0532393 | 3/1993 |
| EP | 0652405 | 5/1995 |
| EP | 0786630 | 7/1997 |
| FR | 2208626 | 6/1974 |
| WO | 2005/024308 | 3/2005 |

OTHER PUBLICATIONS

Non-Final Office Action, mailed Oct. 7, 2010; U.S. Appl. No. 12/324,333; USPTO; 13 pages.

*Abstract—DE 2842771*—Lechmetall Landsberg GMBH, Vorrichtung Und Verfahren Zur Waermebehandlung Von Mahrungsmitteln, Insbesondere Zur Zubereitung Von Speissen, publicaton date: Apr. 10, 1980.

PCT, International Preliminary Report on Patentability, International Application No. PCT/US2009/030236, (Jul. 29, 2010).

\* cited by examiner

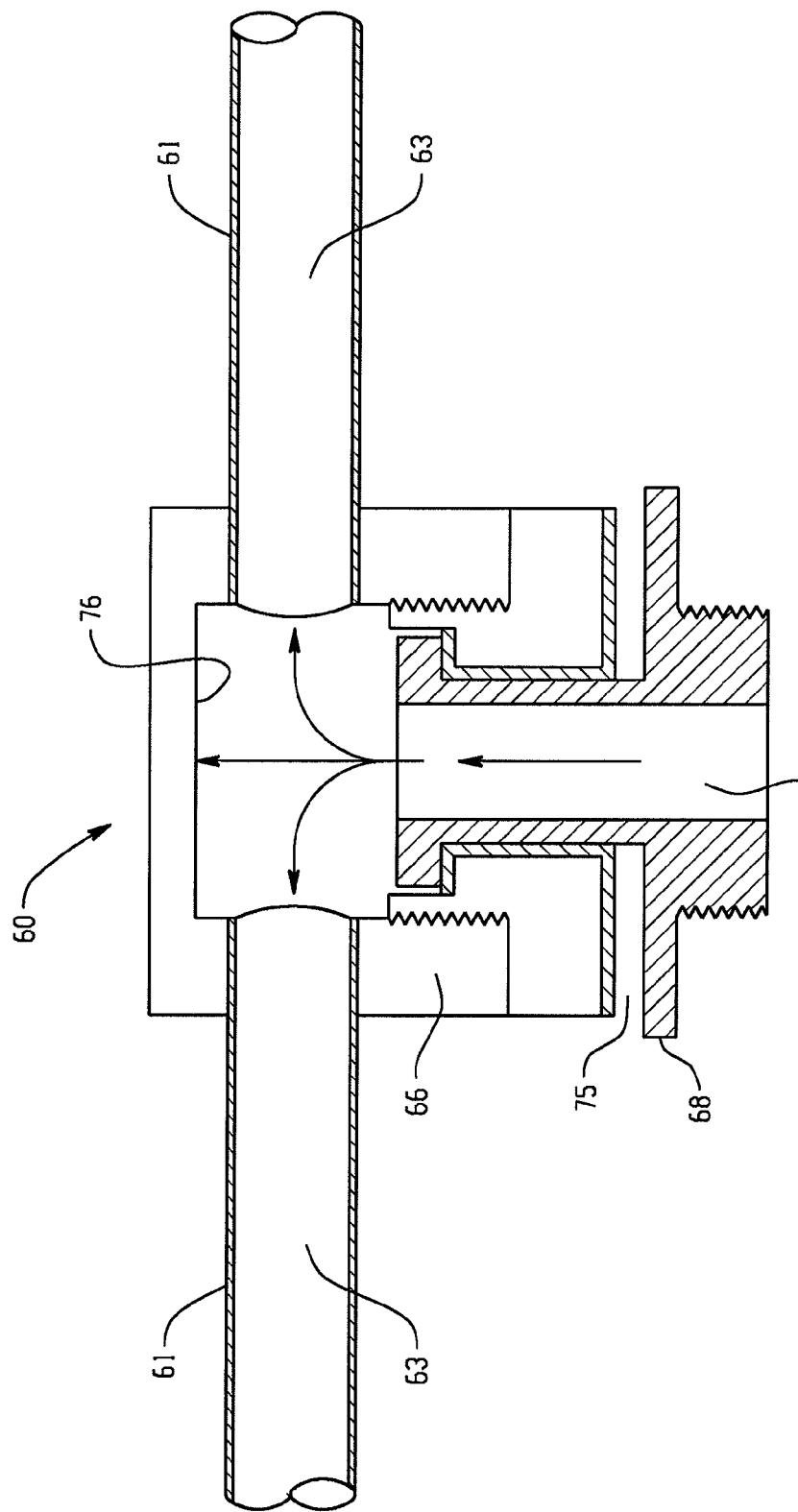

though cleaning may be possible without cleaning such features. The oven may include an oven control system that controls both cooking operations and cleaning operations. A cleaning operation may be initiated by an operator via a cleaning initiation input of the control interface (e.g., via a cleaning button of the interface, via a cleaning menu selection of the interface or via a keypad input).

ROTISSERIE OVEN WITH LIFTING WASH ARM

CROSS REFERENCE TO RELATED APPLICATIONS

This application claims the benefit of U.S. application Ser. No. 61/021,102, filed Jan. 15, 2008, and herein incorporated by reference.

TECHNICAL FIELD

This application relates generally to ovens used for cooking food product and, more specifically, to a rotisserie oven with an integrated cleaning system including a lifting wash arm.

BACKGROUND

Various types of ovens are used for cooking food product. Rotisserie ovens are commonly used in the retail environment to cook chickens and other food products in a manner that permits store customers to view the food product during cooking. Rotisserie style cooking tends to result in grease, juices and food particles within the oven that require the oven to be cleaned regularly. It would be desirable to provide a rotisserie oven (or other type of oven) with a self-cleaning system including advantageous features.

SUMMARY

In some aspects, a self-cleaning rotisserie oven includes a rotatable spray arm mounted to enable the spray arm to lift as a result of forces generated by water pressure during flow through the arm.

In an aspect, a rotisserie oven includes a cooking compartment and a convection system including a heating element and ventilation system configured to heat the cooking compartment. A rotor is positioned within the cooking compartment. A spray arm assembly is within the cooking compartment and includes a spray arm configured to spray liquid into the cooking compartment. The spray arm is mounted for rotation about an axis and configured to be in a lowered position when not spraying liquid and configured to move axially upward along the axis into a raised position when spraying liquid.

In another aspect, a self-cleaning oven includes a cooking compartment and a heating system configured to heat the cooking compartment. A spray arm assembly is within the cooking compartment and includes a spray arm configured to spray liquid into the cooking compartment. The spray arm is mounted for rotation about an axis and configured to be in a lowered position when not spraying liquid and configured to move axially upward along the axis into a raised position when spraying liquid.

In another aspect, a spray arm assembly for use in a self-cleaning oven includes a spray arm configured to spray liquid into a cooking compartment of the self-cleaning oven. The spray arm is mounted for rotation about an axis and configured to be in a lowered position when not spraying liquid and configured to move axially upward along the axis into a raised position when spraying liquid. A bearing journal defines an upper seat and a lower seat. A bearing is mounted for rotational and axial movement with respect to the bearing journal such that in the lowered position a bottom portion of the bearing engages the lower seat and a top portion of the bearing is spaced from the upper seat, and such that in the raised position the top portion of the bearing engages the upper seat and the bottom portion of the bearing is spaced from the lower seat.

In another aspect, a method of cleaning a rotisserie oven including a rotor located within a cooking compartment and a convection system including a heating element and ventilation system configured to heat the cooking compartment is provided. The method includes rotating a spray arm of a spray arm assembly within the cooking compartment about an axis during a cleaning operation. The spray arm moves axially upward along the axis into a raised position when spraying liquid. The spray arm moves axially downward along the axis to a lowered position when not spraying liquid.

BRIEF DESCRIPTION OF THE DRAWINGS

FIGS. 5 and 6 show one embodiment of a lifting spray arm assembly.

DETAILED DESCRIPTION

Figure 1:
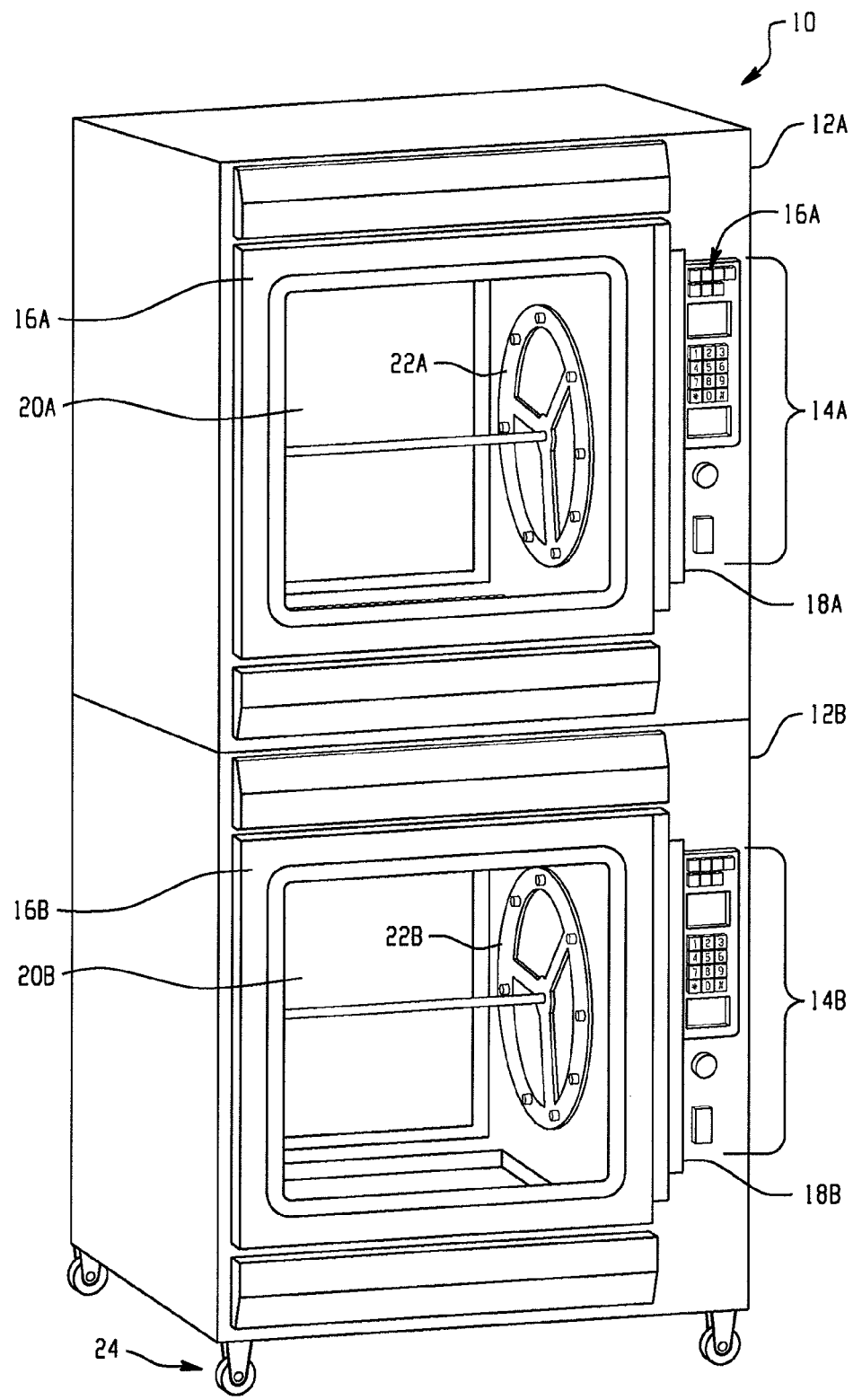
FIG. 1 is a front perspective of a rotisserie system.
Figure 2:
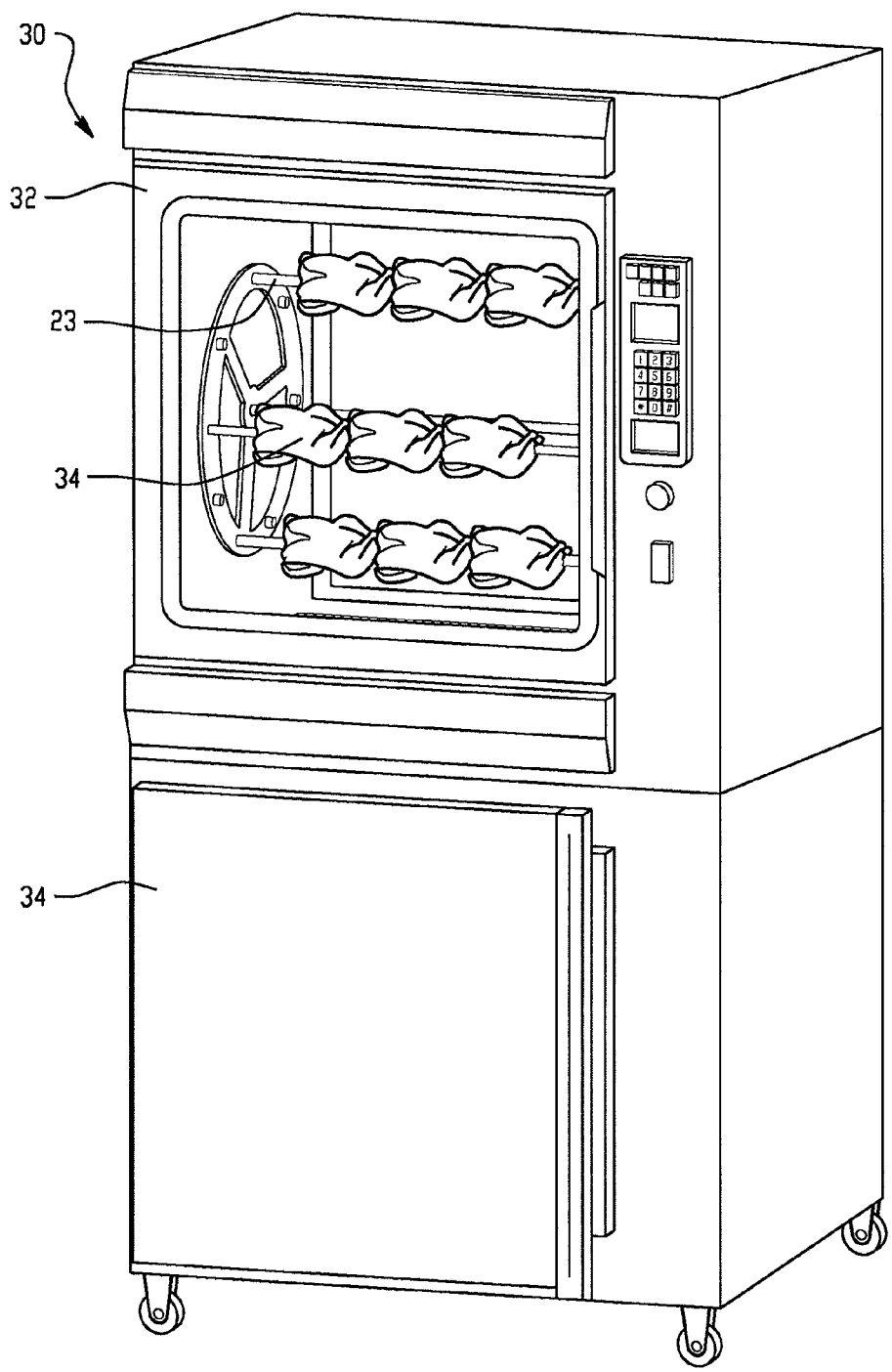
FIG. 2 is a front perspective of another embodiment of a rotisserie system.

Referring to FIG. 1, a rotisserie system 10 is shown including a rotisserie oven 12A stacked atop another rotisserie oven 12B. Each oven includes a respective control interface 14A, 14B, which may include a variety of components, such as an information display area, a numeric keypad, ON/OFF buttons/keys, function specific buttons/keys, and/or various indicator lights. Each oven includes a vertically hinged access door 16A, 16B with a respective handle 18A, 18B and glass front 20A, 20B for viewing the rotisserie operation. The rear side of the oven may also include a viewing window, and in some cases may be formed by a rear door. A rotor 22A, 22B within each oven is also shown. The rotor 22A and 22B rotates a spit 23 that carries food products, such as chickens during cooking (see FIG. 2). The illustrated system is supported by wheels 24 for ease in repositioning the system, with one or more of the wheels 24 including a lock feature. Referring to FIG. 2, a rotisserie system 30 is shown with a single oven 32 stacked atop a lower cabinet 34. The rotor 42 within oven 32 includes birds 34 loaded thereon as per a typical rotisserie cooking operation.

Figure 3:
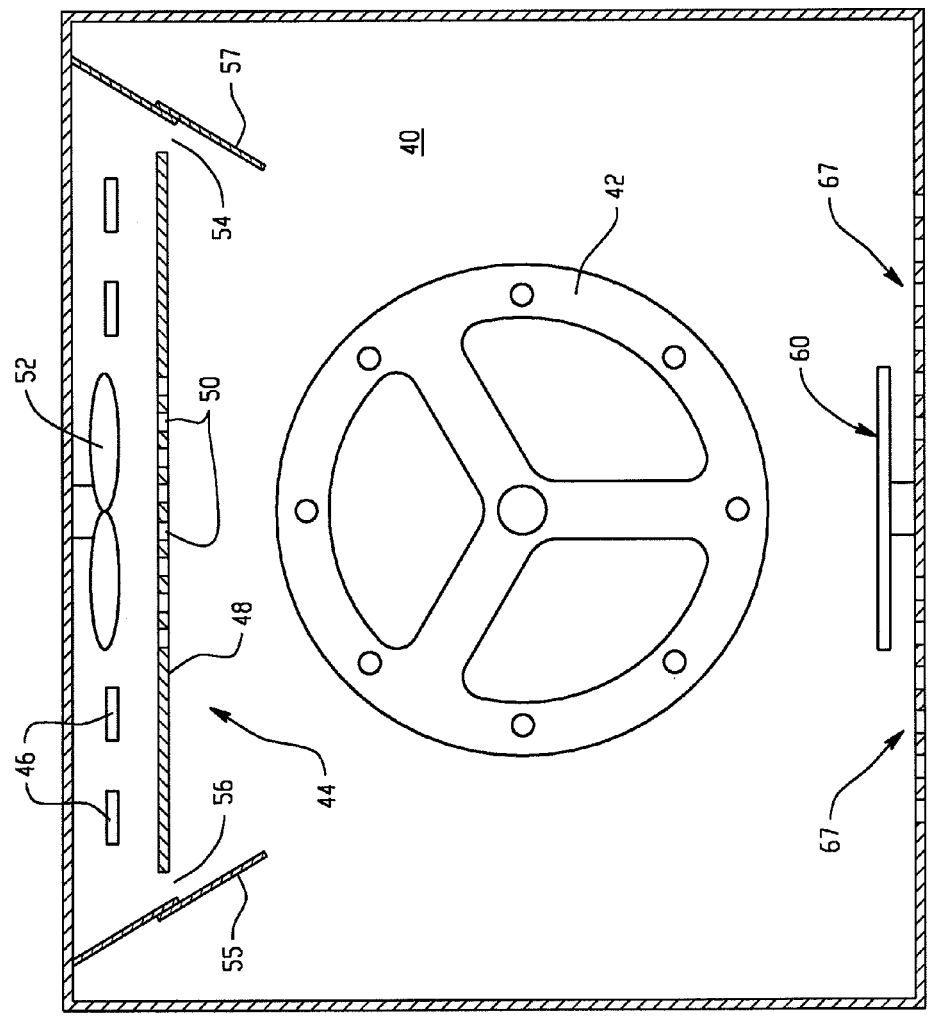
FIG. 3 is a schematic side view of one embodiment of a cooking chamber.

FIG. 3 is a side view layout showing an exemplary oven chamber 40. During rotisserie cooking operations, the rotor 42 rotates as heat is generated by a heating system 44. In the illustrated embodiment, the heating system 44 is formed by heating elements 46 located above an upper plate or shield 48. The plate 48 includes one or more intake openings 50 with associated convection fans 52 arranged to draw air into the openings 50 from the chamber 40. The fans 52 push the air forward and rearward and across the heating elements 46 to pick up heat. The heated air is then directed back into the chamber 40 at forward and rearward slots 54 and 56. Baffles 55 and 57 guide the air inward toward the rotor 42 at the center of the chamber 40 as the heated air passes through the ventilation slots 54 and 56. The space above the plate 48 may include other directional plates or baffles to more effectively produce the forward and rearward air flow.

The rotisserie oven includes a self-cleaning feature that enables the oven to be cleaned during a self-cleaning mode of operation. For this purpose the oven may generally have hook-ups to a source of water and cleaning agent, and may also include a drain path and hook-up to enable the cleaning water to be purged during various points of the cleaning operation. The cleaning operation may include one or more stages, including pre-wash, wash and/or rinse stages. Different cleaning modes (e.g., which may provide different levels of cleaning) may be provided for user selection based upon the user's observation of how clean or dirty the oven is prior to cleaning.

Figure 4:
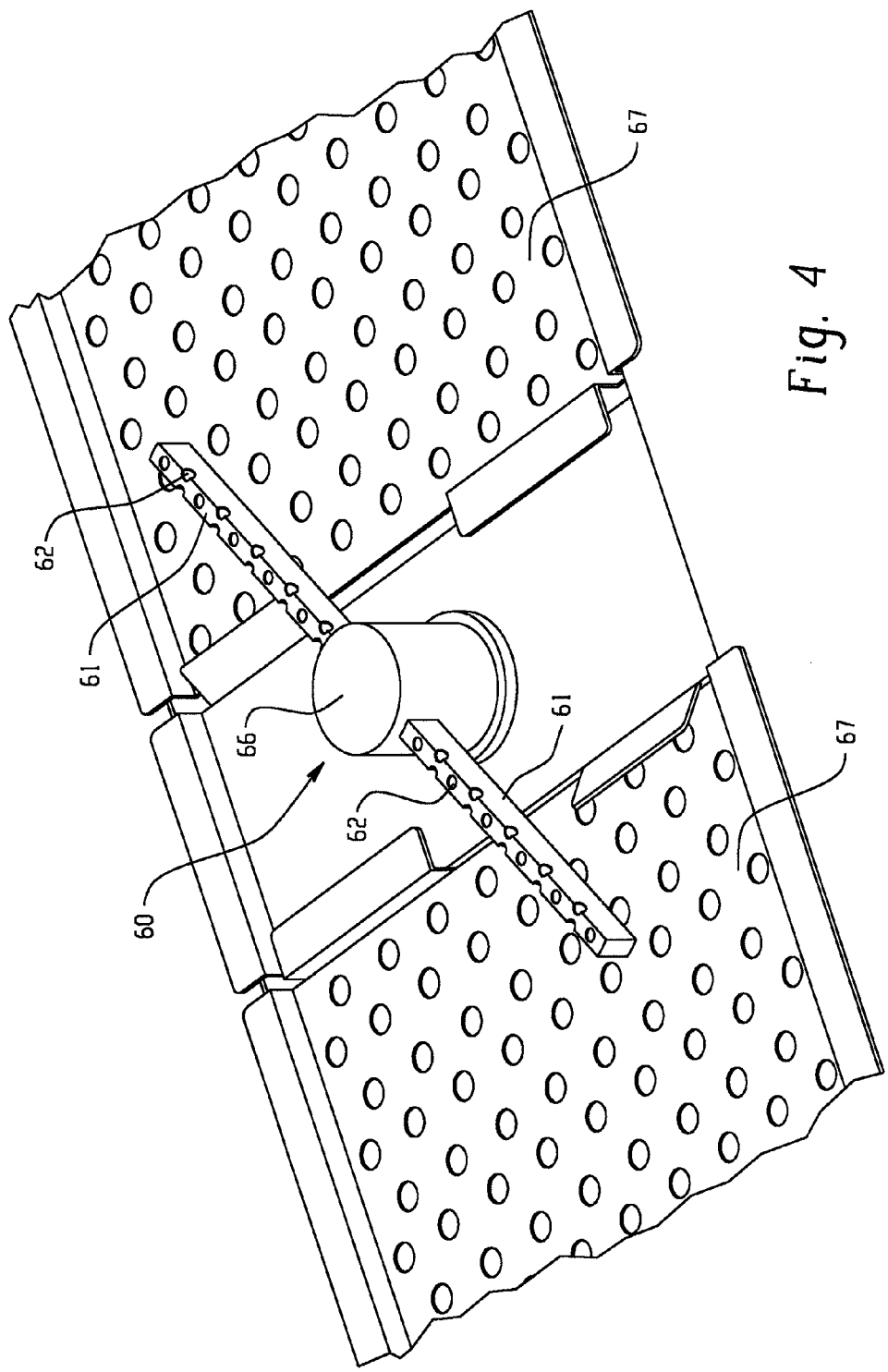
FIG. 4 shows a floor of a cooking chamber including a spray arm assembly and drain manifolds.

In one implementation the self-cleaning feature includes the use of a spray arm assembly 60, shown in FIG. 3 at a bottom portion of the cooking chamber 40. As shown in FIG. 4, the spray arm assembly 60 includes a rotatable spray arm hub 66 upon which is mounted one or more spray arms 61. Each spray arm 61 includes a multiplicity of nozzle openings 62 for ejecting sprays of water during cleaning, and the force of the ejected water urges each arm 61 to rotate. Water is evacuated from the bottom of the chamber 40 through use of the drain strainers 67, which lead to a lower sump area where cleaning liquid collects for recirculation via a pump. Other stationary and/or rotating wash arms and/or nozzles could also be located elsewhere within the oven chamber 40 and/or above the plate 48.

Figure 5:
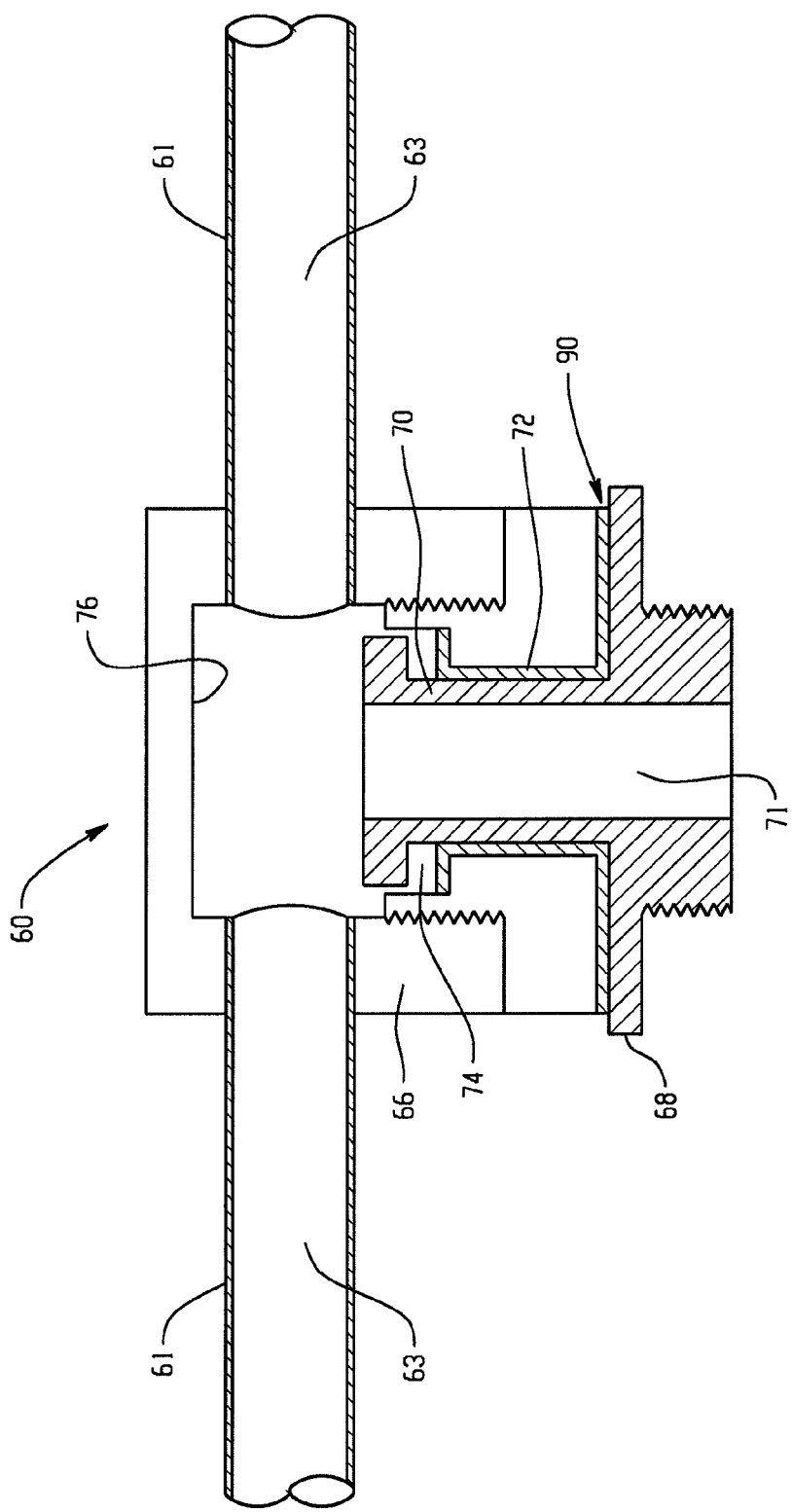

Referring to FIGS. 5 and 6, an advantageous spray arm assembly 60 is shown. In particular, liquids dripping from product being cooked can tend to bond the spray arm hub 66 to its stationary seat 68 at the circumferential periphery 90, preventing or limiting arm rotation. As shown in FIGS. 5 and 6, the bearing journal 70 is formed longer than the bearing 72 to allow for vertical travel of the bearing 72 and spray arm hub 66 along the journal 70. As a result, when the spray arm hub 66 is at rest with no flow/water pressure, a gap 74 is formed between the rim of the journal 70 and the top edge of the bearing 72. When water is applied during a cleaning operation, water flows through a channel 71 within the journal 70, and upon exiting the journal 70 the water exerts pressure on the underside 76 internal of the hub 66. The flow is diverted by the underside 76 of the hub 66 to flow through the channel 63 of each spray arm 61, and exits each arm 61 through the nozzles 62 therein (shown in FIG. 4). The water pressure on the underside 76 internal of the hub 66 lifts the hub 66 sufficiently far to break the bond at the periphery 90 between the hub 66 and the stationary seat 68, allowing the hub 66 and arms 61 to rotate freely for effective cleaning. Thus, during cleaning, a gap 75 exists between the lower edge of the spray arm hub 66 and its stationary seat 68. The lower part of the journal 70 is threaded for securing it to a corresponding threaded opening at the bottom of the chamber 40, and so remains stationary during movement of the bearing 72 and hub 66. Other structural arrangements could be used to produce spray arm lift. By lengthening the journal 70 relative to the bearing 72, the bonding problem is solved while adding no additional parts and minimal additional cost to the spray assembly manufacturing process.

In one implementation the size of the gap 74 is between about 0.040" and 0.125", but larger or smaller gaps could be used. A gap of at least about 0.020", and more particularly at least about 0.040", or even more particularly at least about 0.060" may be beneficial.

The above-described spray arm assembly 60 may have one or more of the following advantages. The spray arm assembly can distribute liquid throughout the cooking chamber and can reduce stripe pattern formation in the cooking chamber due to rotation of the spray arms while spraying liquid. As water pressure builds in the spray arm assembly, the pressure is used to lift the spray arms from the stationary seat. This lifting action can be used to break up grease, dirt and debris to ease start up rotation of the rotating spray arms. The rotisserie oven can be stacked as shown in FIG. 1, located on a stand as shown by FIG. 2, located atop a counter, located atop a combination oven, located atop a convention oven, etc. In some embodiments, the rotor 42 may rotate baskets that hold the food product instead of spits.

It is to be clearly understood that the above description is intended by way of illustration and example only, is not intended to be taken by way of limitation, and that other changes and modifications are possible.

What is claimed is:

1. A oven, comprising:
    a cooking compartment;
    a convection system including a heating element and ventilation system configured to heat the cooking compartment;
    a spray arm assembly within the cooking compartment, the spray arm assembly including an elongated rotatable spray arm mounted for rotation about an axis, the elongated rotatable spray arm having and an internal channel leading to multiple nozzle openings located on the spray arm for rotation therewith and configured to spray liquid into the cooking compartment, the elongated rotatable spray arm and nozzle openings located thereon configured to be in a lowered position when not spraying liquid, the elongated rotatable spray arm and nozzle openings located thereon configured to move axially upward along the axis into a raised position when spraying liquid, in both the lowered position and the raised position the elongated rotatable spray arm and nozzle openings are within the cooking compartment.

2. The oven of claim 1, wherein the elongated rotatable spray arm rotates due to pressure from sprayed liquid ejected from nozzles of the elongated rotatable spray arm, and wherein the elongated rotatable spray arm and nozzle openings located thereon move from the lowered position to the raised position due to pressure from liquid passing through the spray arm assembly.

3. The oven of claim 2, wherein the spray arm assembly includes a bearing journal defining an upper seat and a lower seat, a bearing mounted for rotational and axial movement with respect to the bearing journal such that in the lowered position a bottom portion of the bearing engages the lower seat and a top portion of the bearing is spaced from the upper seat and in the raised position the top portion of the bearing engages the upper seat and the bottom portion of the bearing is spaced from the lower seat.

4. The oven of claim 3, wherein axial movement of the arm and bearing between the lowered position and the raised position is between about 0.04 inch and 0.125 inch.

5. The oven of claim 4, further comprising a drain along a bottom portion of the cooking compartment.

6. The oven of claim 1, the spray arm assembly further including:
    a stationary bearing journal through which the liquid flows, the journal including a first stop at a first end and a second stop at a second end, the second stop proximate to where the liquid exits the journal;
    a bearing surrounding the stationary bearing journal, the bearing axially shorter than the bearing journal such that the bearing can move axially along the bearing journal;
    a spray arm hub connected to the bearing to move along with the bearing;
    wherein the journal, bearing, and hub are configured such that the bearing rests against the first stop in the lowered position when the elongated rotatable spray arm is not in operation; and wherein the journal, bearing, and hub are configured such that water flowing through the journal will exert pressure on the hub which will push the hub and bearing axially upward along the journal, resulting in the bearing resting against the second stop in the raised position when the elongated rotatable spray arm is in operation.

7. The oven of claim 6, wherein the force of gravity acts to pull the hub and bearing down into the lowered position when the elongated rotatable spray arm is not in operation, and wherein the pressure from the wash water acts against the force of gravity to hold the hub and up into the raised position when the elongated rotatable spray arm is in operation.

8. A self-cleaning oven, comprising:
a cooking compartment;
a heating system configured to heat the cooking compartment; and
a spray arm assembly within the cooking compartment, the spray arm assembly including a rotatable sera arm with multiple nozzle openings thereon configured to sera liquid into the cooking compartment, the rotatable spray arm mounted for rotation about an axis and configured to be in a lowered position when not spraying liquid, the rotatable spray arm configured to move axially upward along the axis into a raised position when spraying liquid, the multiple nozzle openings also move upward with the rotatable spray arm, the spray arm assembly further including:
a stationary bearing journal through which the liquid flows, the journal including a first stop at a first end and a second stop at a second end, the second stop proximate to where the liquid exits the journal;
a bearing surrounding the stationary bearing journal, the bearing axially shorter than the bearing journal such that the bearing can move axially along the bearing journal;
a spray arm hub connected to the bearing journal to move along with the bearing;
wherein the journal, bearing, and hub are configured such that the bearing rests against the first stop in the lowered position when the rotatable spray arm is not in operation; and
wherein the journal, bearing, and hub are configured such that water flowing through the journal will exert pressure on the hub which will push the hub and bearing axially upward along the journal, resulting in the bearing resting against the second stop in the raised position when the rotatable spray arm is in operation.

9. A self-cleaning oven, comprising:
a cooking compartment and a spray arm assembly within the cooking compartment, the spray arm assembly including:
a rotatable spray arm with multiple nozzle openings located thereon and configured to spray liquid out of the arm and into the cooking compartment, the rotatable spray arm mounted for rotation about an axis and configured to be in a lowered position when not spraying liquid and configured to move axially upward along the axis into a raised position when spraying liquid, the multiple nozzle openings move upward with the rotatable spray arm;
a bearing journal extending upward within the cooking compartment and defining an upper seat and a lower seat, the bearing journal including a flow channel therethrough for delivering liquid to the spray arm for spraying; and
a bearing operably connected for rotation with the spray arm, the bearing mounted about the bearing journal for rotational and axial movement with respect to the bearing journal such that in the lowered position a bottom portion of the bearing engages the lower seat and a top portion of the bearing is spaced from the upper seat, and such that in the raised position the top portion of the bearing engages the upper seat and the bottom portion of the bearing is spaced from the lower seat.

10. The oven of claim 9, wherein axial movement of the arm and bearing between the lowered position and the raised position is between about 0.04 inch and 0.125 inch.

11. A method of cleaning a rotisserie oven including a rotor located within a cooking compartment of an oven having a convection system including a heating element and ventilation system configured to heat the cooking compartment, the method comprising:
utilizing an elongated spray arm within the cooking compartment, the spray arm rotatable about an axis during a cleaning operation, the spray arm including multiple nozzle openings thereon that move with the spray arm, the spray arm vertically movable between a lowered position in which the spray arm and nozzle openings are within the cooking compartment and a raised position in which the spray arm and nozzle openings are within the cooking compartment;
moving the spray arm and multiple nozzle openings thereon axially upward along the axis into the raised position when spraying liquid, which spraying effects a rotating of the spray arm and nozzle openings thereon; and
moving the spray arm and multiple nozzle openings thereon axially downward along the axis to the lowered position when not spraying liquid; and
wherein the step of moving the spray arm and multiple nozzle openings thereon axially upward along the axis into the raised position when spraying liquid acts to break up grease that acts to inhibit spray arm rotation.

12. The method of claim 11, wherein the step of rotating the spray arm includes rotating the spray arm due to pressure from sprayed liquid ejected from nozzles of the spray arm, and wherein the step of moving the spray arm and multiple nozzle openings axially upward includes moving the spray arm from the lowered position to the raised position due to pressure from liquid passing through the spray arm assembly.

13. The method of claim 11, wherein the spray arm assembly includes a bearing journal defining an upper seat and a lower seat, a bearing mounted for rotational and axial movement with respect to the bearing journal such that in the lowered position a bottom portion of the bearing engages the lower seat and a top portion of the bearing is spaced from the upper seat and in the raised position the top portion of the bearing engages the upper seat and the bottom portion of the bearing is spaced from the lower seat.

14. The rotisserie oven of claim 1, wherein the movement of the spray arm and multiple nozzle openings thereon from the lowered position to the raised position is sufficient to break up grease that acts to inhibit spray arm rotation.

15. The self-cleaning oven of claim 8, wherein the spray arm assembly includes a bearing journal defining an upper seat and a lower seat, a bearing mounted for rotational and axial movement with respect to the bearing journal such that in the lowered position a bottom portion of the bearing engages the lower seat and a top portion of the bearing is spaced from the upper seat and in the raised position the top portion of the bearing engages the upper seat and the bottom portion of the bearing is spaced from the lower seat.

16. The self-cleaning oven of claim 15, wherein axial movement of the arm and bearing between the lowered position and the raised position is between about 0.04 inch and 0.125 inch.

* * * * *

UNITED STATES PATENT AND TRADEMARK OFFICE
CERTIFICATE OF CORRECTION

PATENT NO. : 8,752,538 B2
APPLICATION NO. : 12/323673
DATED : June 17, 2014
INVENTOR(S) : Richard D. Valentine, Matthew A. Weber and James M. Heiser It is certified that error appears in the above-identified patent and that said Letters Patent is hereby corrected as shown below:

In the Claims:

In Claim 8, at Column 5, Line 19 and 20 read:

"spray arm assembly including a rotatable sera arm with multiple
nozzle openings thereon configured to sera liq-"

Should read:

"spray arm assembly including a rotatable spray arm with multiple
nozzle openings thereon configured to spray liq-"

Signed and Sealed this
Twenty-sixth Day of August, 2014

Michelle K. Lee
*Deputy Director of the United States Patent and Trademark Office*